United States Patent
Im et al.

(10) Patent No.: US 9,323,857 B2
(45) Date of Patent: Apr. 26, 2016

(54) SYSTEM AND METHOD FOR PROVIDING CONTENT-RELATED INFORMATION BASED ON DIGITAL WATERMARK AND FINGERPRINT

(71) Applicant: Electronics and Telecommunications Research Institute, Daejeon (KR)

(72) Inventors: Dong-Hyuck Im, Daejeon (KR); Won Ryu, Seoul (KR); Il-Gu Jung, Daejeon (KR); Seng-Kyoun Jo, Cheongju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 6 days.

(21) Appl. No.: 14/291,191

(22) Filed: May 30, 2014

(65) Prior Publication Data

US 2015/0117700 A1     Apr. 30, 2015

(30) Foreign Application Priority Data

Oct. 31, 2013   (KR) ................. 10-2013-0131646
Jan. 17, 2014   (KR) ................. 10-2014-0006215

(51) Int. Cl.
*G06T 1/00*     (2006.01)
*G06F 17/30*    (2006.01)

(52) U.S. Cl.
CPC ............................... *G06F 17/30876* (2013.01)

(58) Field of Classification Search
CPC .................................................. G06T 2201/00
USPC .......................................................... 382/100
See application file for complete search history.

(56) References Cited

U.S. PATENT DOCUMENTS

| | | | |
|---|---|---|---|
| 7,469,422 B2 | 12/2008 | Morimoto et al. | |
| 8,300,884 B2 | 10/2012 | Sharma | |
| 2003/0223584 A1* | 12/2003 | Bradley | G06T 1/0028 380/229 |
| 2010/0322469 A1* | 12/2010 | Sharma | G10L 19/018 382/100 |
| 2012/0151598 A1 | 6/2012 | Lee et al. | |
| 2013/0239163 A1 | 9/2013 | Kim et al. | |
| 2015/0016661 A1* | 1/2015 | Lord | H04N 21/42203 382/100 |

FOREIGN PATENT DOCUMENTS

| KR | 100659870 A | 12/2006 |
|---|---|---|
| KR | 1020110010084 A | 1/2011 |
| KR | 1020130083457 A | 7/2013 |

\* cited by examiner

*Primary Examiner* — Stephen R Koziol
*Assistant Examiner* — Delomia L Gilliard
(74) *Attorney, Agent, or Firm* — William Park & Associates Ltd.

(57) ABSTRACT

In a method for providing content-related information based on a digital watermark and fingerprint, the method includes: receiving a request for content-related information from a client terminal; using a watermark and a fingerprint of content to retrieve the requested content-related information from a database; and transmitting the retrieved content-related information to the client terminal.

3 Claims, 7 Drawing Sheets

SYSTEM AND METHOD FOR PROVIDING CONTENT-RELATED INFORMATION BASED ON DIGITAL WATERMARK AND FINGERPRINT

CROSS-REFERENCE TO RELATED APPLICATION(S)

This application claims priority from Korean Patent Application Nos. 10-2013-0131646 filed on Oct. 31, 2013 and 10-2014-0006215 filed on Jan. 17, 2014, in the Korean Intellectual Property Office, the entire disclosures of which are incorporated herein by references for all purposes.

BACKGROUND

1. Field

The following description relates to a technology for providing information in response to a client's request, and more particularly to a technology for providing content-related information.

2. Description of the Related Art

The digital fingerprinting technology is one of the most well-known automatic content recognition (ACR) technologies. In a content recognition technology using a digital fingerprint, content features are provided in a database to be used for content recognition. Such fingerprinting technology for content recognition has an effect in that the technology may be applied to various types of content distributed previously, without any need for content transformation. However, the technology also has a drawback in that only one service may be provided per content, and thus unable to provide various services.

For reference, Korean Laid-open Patent Publication No. 10-2011-0010084 (published on Jan. 31, 2011) discloses such technology.

SUMMARY

Provided is a technology for providing various additional services per content.

According to an exemplary embodiment, there is provided a method for providing content-related information based on a digital watermark and fingerprint, the method including: receiving a request for content-related information from a client terminal; using a watermark and a fingerprint of content to retrieve the requested content-related information from a database; and transmitting the retrieved content-related information to the client terminal.

The receiving of the request may include receiving watermark information and fingerprint information of the content from the client terminal.

The watermark information received from the client terminal may be information in which the watermark has been decoded.

The transmitting may include integrating the content-related information retrieved by using the watermark information with the content-related information retrieved by using the fingerprint information.

The integrating may include classifying, into categories, the content-related information retrieved by using the watermark information and the content-related information retrieved by using the fingerprint information, to integrate the classified information by each category.

The method may further include: generating a watermark for content to insert the generated watermark into the content; storing information on the generated watermark and content-related information associated with the information on the generated watermark in the database; extracting a fingerprint from the content; and storing information on the extracted fingerprint and content-related information associated with the information on the extracted fingerprint in the database.

According to another exemplary embodiment, there is provided a system for providing content-related information based on a digital watermark and fingerprint, the system including: a database; and a server controller configured to retrieve content-related information from a database by using content watermark information received from a client terminal, and to retrieve content-related information from a database by using content fingerprint information received from the client terminal, so as to provide the client terminal with the retrieved content-related information associated with the watermark information and the retrieved content-related information associated with fingerprint information.

According to yet another exemplary embodiment, there is provided a method for providing content-related information by a client terminal based on a digital watermark and fingerprint, the method including: capturing content; extracting a watermark from the captured content; extracting a fingerprint from the captured content; transmitting information on each of the extracted watermark and fingerprint to a server to request content-related information associated with the watermark information and content-related information associated with the fingerprint information; and receiving the requested content-related information associated with the watermark information and the requested content-related information associated with the fingerprint information.

The extracting of the watermark may include decoding the extracted watermark.

The receiving may include receiving content-related service information in which content-related information associated with the watermark information and content-related information associated with the fingerprint information are integrated.

The integrated content-related service information may be information in which content-related information associated with the watermark and content-related information associated with the fingerprint are classified into categories to be integrated by each category.

According to yet another exemplary embodiment, there is provided a client terminal capable of providing content-related information based on a digital watermark and fingerprint, the client terminal including: a capturer configured to capture content; a watermark extractor configured to extract a watermark from the captured content; a fingerprint extractor configured to extract a fingerprint from the captured content; and a content-related information receiver configured to transmit information on each of the extracted watermark and fingerprint to a server to request content-related information associated with the watermark and content-related information associated with the fingerprint, and to receive the requested content-related information from the server.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
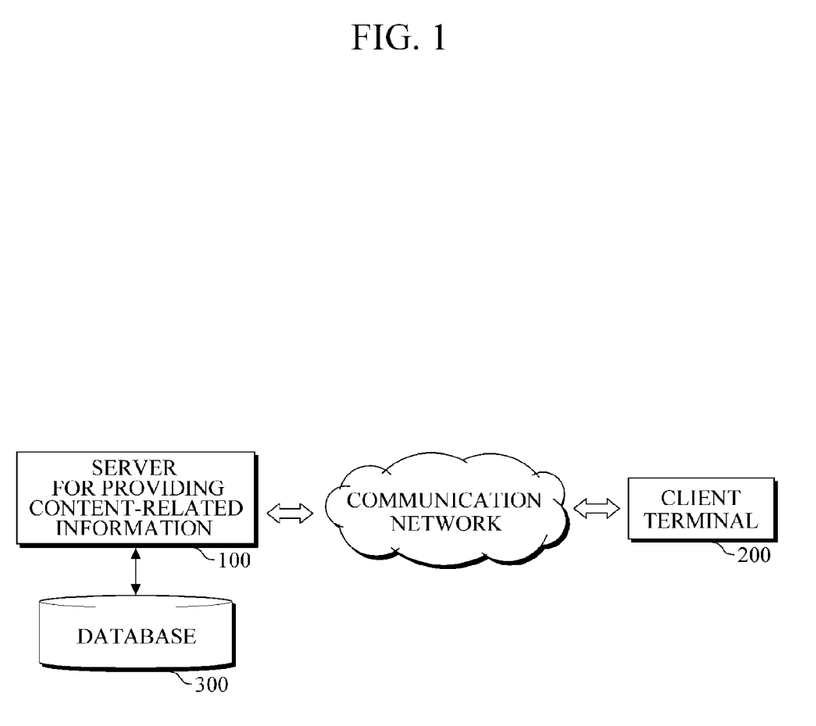
FIG. 1 is a block diagram illustrating an example of a system for providing content-related information based on a digital watermark and fingerprint according to an exemplary embodiment.

FIG. 1 is a block diagram illustrating an example of a system for providing content-related information based on a digital watermark and fingerprint according to an exemplary embodiment. As illustrated in FIG. 1, the system for providing content-related information includes a server 100 for providing content-related information and a client terminal 200. The server 100 for providing content-related information and the client terminal 200 may communicate with each other through a communication network. The server 100 for providing content-related information is a server that provides information on distributed content, and that uses a watermark and a fingerprint to provide content-related information to the client terminal 200. The client terminal 200 is a terminal to which content is distributed to be used, and which may be a fixed terminal, such as a desktop computer, or a mobile terminal, such as a smartphone. The client terminal 200 may transmit a request for content-related information to the server 100 for providing content-related information, and may receive the requested information. A database 300 contains content-related information, which may be associated with watermark information or fingerprint information of content. Here, content-related information associated with watermark information may be different from content-related information associated with fingerprint information.

Figure 2:
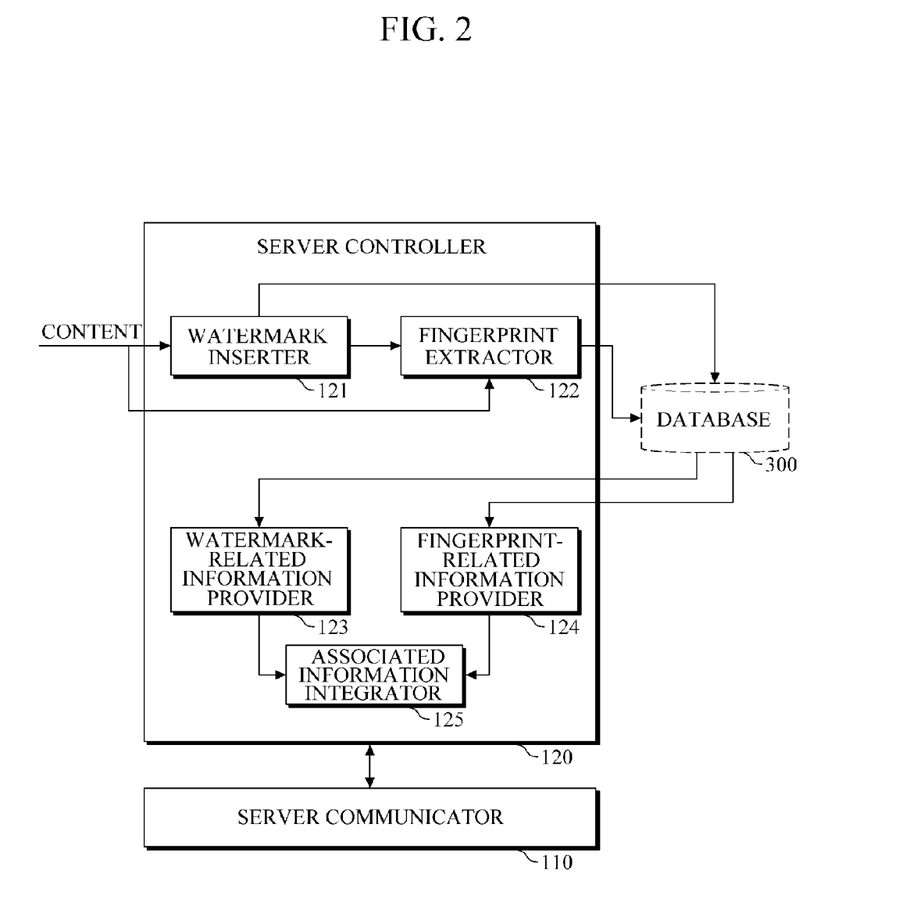
FIG. 2 is a block diagram illustrating an example of a server for providing content-related information according to an exemplary embodiment.

FIG. 2 is a block diagram illustrating an example of a server for providing content-related information according to an exemplary embodiment. As illustrated in FIG. 2, the server 100 for providing content-related information includes a server communicator 110 and a server controller 120. The server communicator 110 is configured to communicate with external devices through a communication network, as is well known in the art. The server controller 120 may include one or more processors. The server controller 120 may include a watermark inserter 121 and a fingerprint extractor 122, in which the watermark inserter 121 and the fingerprint extractor 122 may be embodied as software. The watermark inserter 121 generates a watermark to be inserted into content, inserts the generated watermark into content, associates information on the generated watermark with content-related information (hereinafter referred to as "first associated information"), and stores the associated information in the database 300. The first associated information, in which content-related information is associated with watermark information, may be selected by a user. The fingerprint extractor 122 extracts, from content into which a watermark may be or may not be inserted, a fingerprint that indicates feature points of content, associates information on the extracted fingerprint with content-related information (hereinafter referred to as "second associated information"), and stores the associated information in the database 300. The second associated information, in which content-related information is associated with fingerprint information, may be selected by a user. Further, it is desirable that a fingerprint extracted from watermark-inserted content is identical to a fingerprint extracted from the original content into which no watermark was inserted, but the fingerprint is not limited thereto. As described above, the first associated information, which is associated with watermark information, and the second associated information, which is associated with fingerprint information are constructed in such manner.

The server controller 120 may further include a watermark-related information provider 123 and a fingerprint-related information provider 124. The watermark-related information provider 123 and the fingerprint-related information provider 124 may also be embodied as software. In response to a request for content-related information from the client terminal 200, the watermark-related information provider 123 retrieves the first associated information that is associated with watermark information from the database 300, in which the watermark information may be information received from the client terminal 200 through the server communicator 110, and may be information in which watermark has been decoded. Further, in response to a request for content-related information from the client terminal 200, the fingerprint-related information provider 124 retrieves the second associated information that is associated with fingerprint information from the database 300, in which the fingerprint information may be information received from the client terminal 200 through the server communicator 110. The first associated information and the second associated information retrieved from the database 300 are transmitted to the client terminal 200 through the server communicator 110.

The server controller 120 may further include an associated information integrator 125, which may also be embodied as software. The associated information integrator 125 integrates the first associated information provided from the watermark-related information provider 123 and the second associated information provided from the fingerprint-related information provider 124 to generate content-related service information. According to an exemplary embodiment, the associated information integrator 125 classifies various types of information included in the first associated information and the second associated information into categories, and integrates the classified information by each category. For example, content-related information may be classified into video, audio, and text categories, and information classified into an identical category is integrated by each category. The integrated content-related service information is transmitted to the client terminal 200 through the server communicator 110. In another example, watermark information may be shown first at the top of the client terminal 200, and fingerprint information may be shown at the bottom thereof. Watermark information, which is integrated into content with a purpose, may be more useful information compared to fingerprint information.

Figure 3:
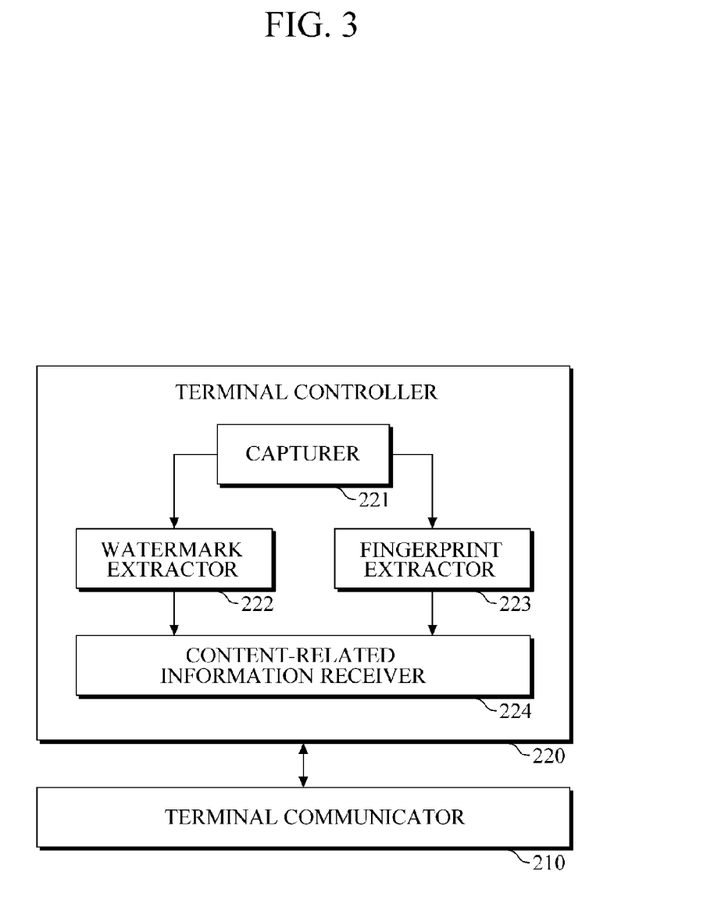
FIG. 3 is a block diagram illustrating an example of a client terminal according to an exemplary embodiment.

FIG. 3 is a block diagram illustrating an example of a client terminal according to an exemplary embodiment. As illustrated in FIG. 3, the client terminal 200 includes a terminal communicator 210 and a terminal controller 220. The terminal communicator 210 is configured to communicate with a server through a communication network, as is well known in the art. The terminal controller 220 may include one or more processors. The terminal controller 220 may include a capturer 221, a watermark extractor 222, a fingerprint extractor 223 and a content-related information receiver 224. The capturer 221, which may be configured to have various known capture solutions, captures distributed content. The watermark extractor 222 extracts a watermark from captured content, and the fingerprint extractor 223 extracts a fingerprint from captured content. A method for extracting a watermark and a method for extracting a fingerprint are well known in the art. The content-related information receiver 224 transmits information on the watermark extracted by the watermark extractor 222 and information on the fingerprint extracted by the fingerprint extractor 223 to the server 100 for providing content-related information, and requests the first associated information and the second associated information. In this case, watermark information transmitted to the server 100 for providing content-related information may be information in which a watermark has been decoded. To this end, the watermark extractor 222 may decode an extracted watermark. Further, in a case where no watermark was inserted in content, only a request for the second associated information is transmitted to the server 100 for providing content-related information. The content-related information receiver 224 receives, depending on a request, the first associated information and the second associated information, or only the second associated information from the server 100 for providing content-related information through the terminal communicator 210. According to an exemplary embodiment, the content-related information receiver 224 receives content-related service information, in which the first associated information and the second associated information are integrated. Various types of information included in the first associated information and the second associated information may be classified into categories to be integrated by each category. As a result, the content-related information receiver 224 may readily provide content-related information of each category to a user through a user interface.

The watermark extractor 222 decodes an extracted watermark in consideration of, for example, a case where information obtained by decoding may be a uniform resource locator (URL). In this case, the client terminal 200 directly accesses the URL to obtain the first associated information. Thus, there is no need to transmit a request for the first associated information to the server 100 for providing content-related information. However, if information obtained by decoding is merely information to identify a watermark, a request for the first associated information is required to be transmitted to the server 100 for providing content-related information.

Figure 4:
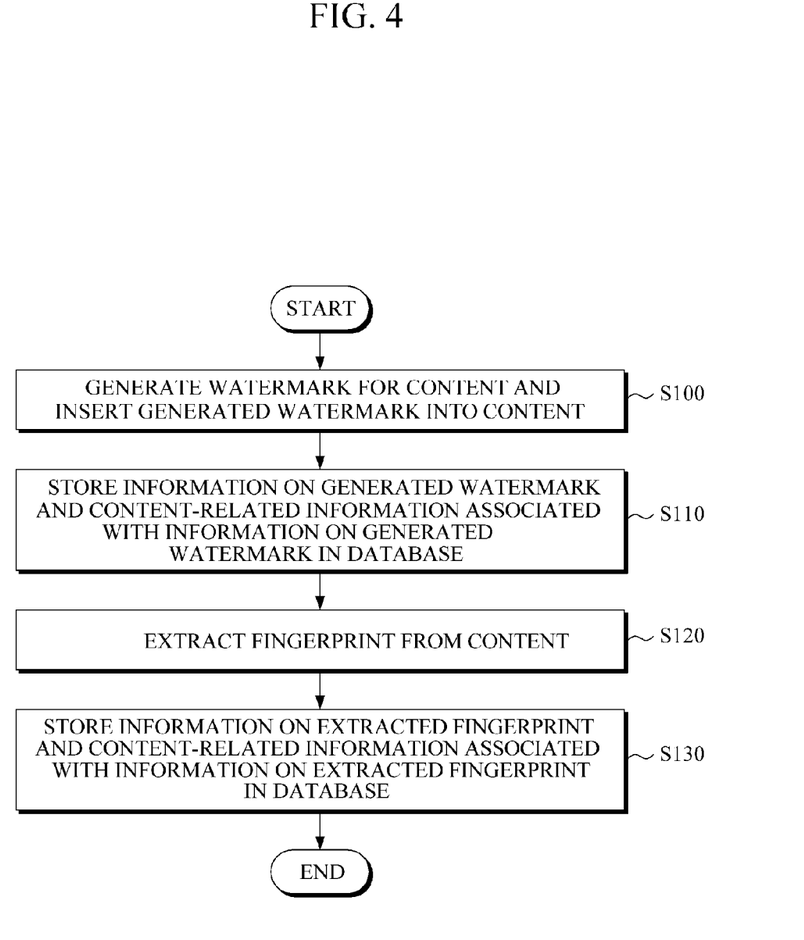
FIG. 4 is a flowchart illustrating an example of inserting content-related information and a watermark/fingerprint for content recognition according to an exemplary embodiment.

FIG. 4 is a flowchart illustrating an example of inserting content-related information and a watermark/fingerprint for content recognition according to an exemplary embodiment. The server 100 for providing content-related information generates a watermark for content to be distributed, to insert the generated watermark into the content in S100, and associates information on the generated watermark with the first associated information to store the information in the database 300 in S110. The first associated information, which is associated with watermark information, may be selected by a user. Further, the server 100 for providing content-related information extracts a fingerprint from content in S120. In S120, in a case where a watermark was inserted in content, the server 100 for providing content-related information extracts a fingerprint from watermark-inserted content, and in a case where no watermark was inserted in content, the server 100 for providing content-related information extracts a fingerprint from the original content in which no watermark was inserted. It is desirable that a fingerprint extracted from watermark-inserted content is identical to a fingerprint extracted from content into which no watermark was inserted. When a fingerprint is extracted, the server 100 for providing content-related information associates information on the extracted fingerprint with the second associated information to store the information in the database 300 in S130. The second associated information, which is associated with fingerprint information, may be selected by a user. As described above, the first associated information, which is associated with watermark information, and the second associated information, which is associated with fingerprint information are constructed in such manner. In this case, operation S120 is not necessarily required to be performed after operation S100, as S120 may be performed before S100, and operations S120 and S100 may be performed separately and simultaneously.

Figure 5:
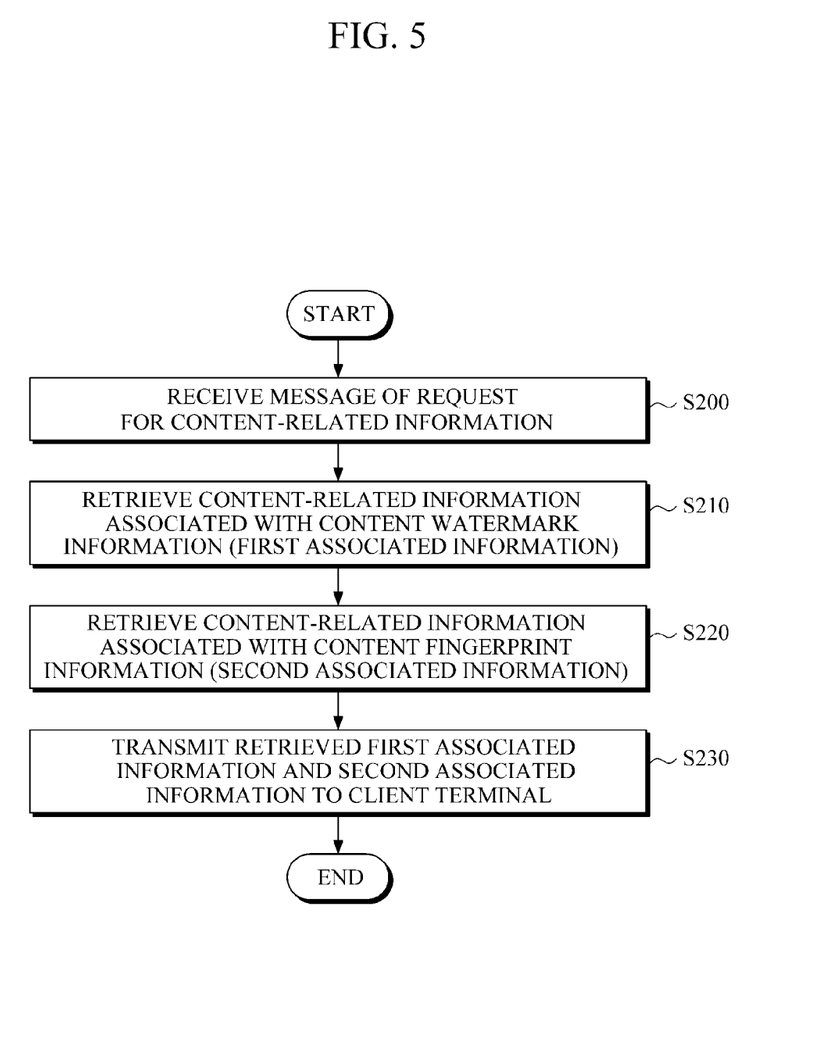
FIG. 5 is a flowchart illustrating an example method of providing content-related information by a server for providing content-related information according to an exemplary embodiment.
Figure 6:
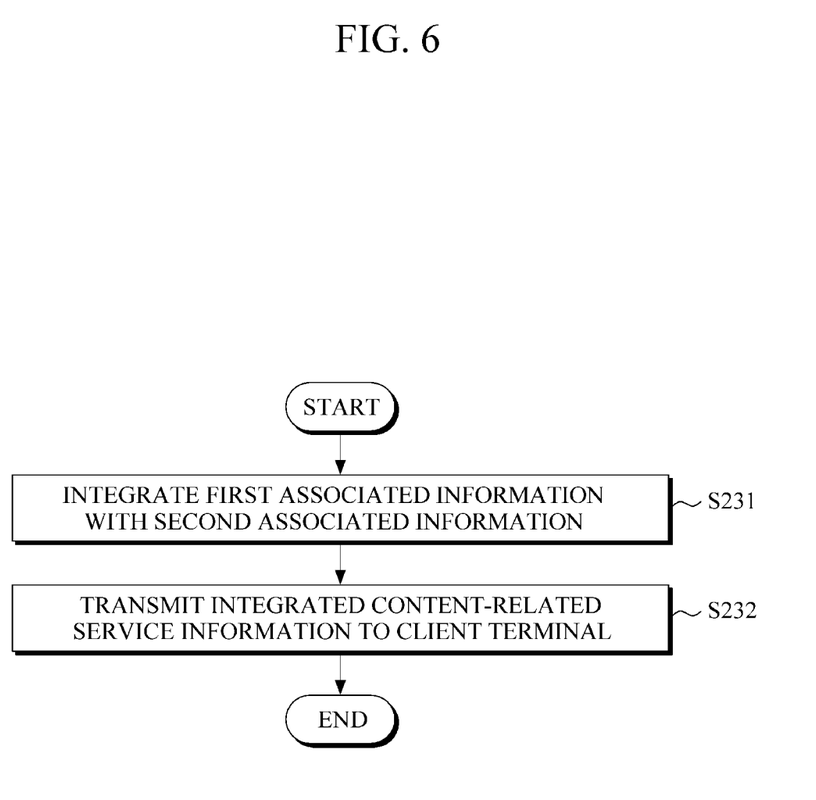
FIG. 6 is a flowchart illustrating in detail operation S230 of FIG. 5.

FIG. 5 is a flowchart illustrating an example method of providing content-related information by a server for providing content-related information according to an exemplary embodiment, and FIG. 6 is a flowchart illustrating in detail operation S230 of FIG. 5. The server 100 for providing content-related information receives a message of request for content-related information from the client terminal 200 in S200. The server 100 for providing content-related information identifies watermark information included in the message of request for content-related information, and retrieves the first associated information that is associated with the identified watermark information from the database 300 in S210. As watermark information may not be included in a message of request for content-related information, the operation of retrieving the first associated information from the database 300 may be omitted. Further, the server 100 for providing content-related information identifies fingerprint information included in a message of request for content-related information, and retrieves the second associated information that is associated with the identified fingerprint information from the database 300 in S220. Upon completion of retrieving the first associated information and the second associated information, the server 100 for providing content-related information transmits the retrieved first and second associated information to the client terminal 200 in S230. According to an exemplary embodiment, the server 100 for providing content-related information integrates the first associated information and the second associated information to generate content-related service information in S231, and the generated content-related service information is transmitted to the client terminal 200 in S232. Further, in S230, the server 100 for providing content-related information may classify various types of information included in the first associated information and the second associated information into categories, and may integrate the classified information by each category. In this case, operations S210 and S220 may be performed reversely, or may be performed separately and simultaneously.

Figure 7:
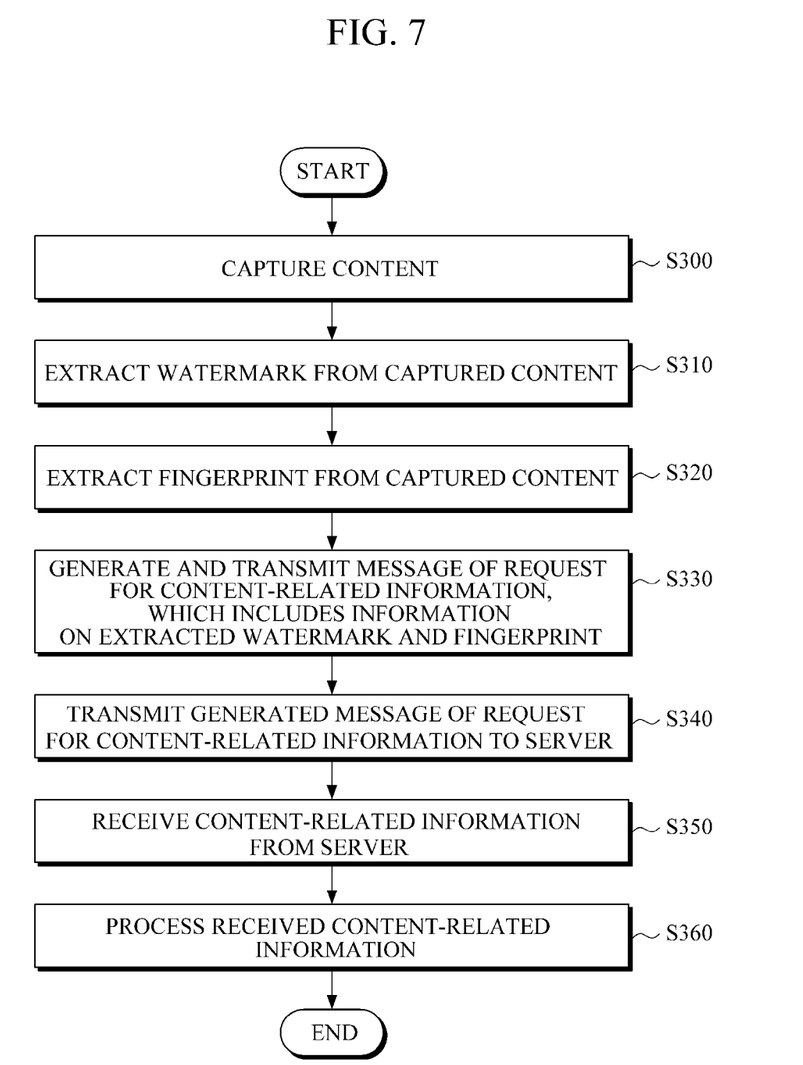
FIG. 7 is a flowchart illustrating an example method of providing content-related information by a client terminal according to an exemplary embodiment.

FIG. 7 is a flowchart illustrating an example method of providing content-related information by a client terminal according to an exemplary embodiment.

The client terminal 200 captures content in S300, extracts a watermark from the captured content in S310, and extracts a fingerprint from the captured content in S320. In a case where a watermark was not inserted into content, the watermark is not extracted in S310. The client terminal 200 generates a message of request for content-related information, in which the message of request includes information on each of the extracted watermark and fingerprint, and transmits the generated message of request for content-related information to the server 100 for providing content-related information in S330. In response to the message of request for content-related information, the client terminal 200 receives content-related information from the server 100 for providing content-related information in S340. The content-related information received in S340 may be information in which the first associated information and the second associated information are included, or only the second associated information is included. In a case where the content-related information includes both the first associated information and the second associated information, the content-related information may be content-related service information in which the first associated information and the second associated information are integrated, and various types of information included in the first associated information and the second associated information may be classified into categories to be integrated by each category.

According to an exemplary embodiment, by using both a watermark and a fingerprint for content recognition, it is possible to provide, for watermark-inserted content, not only services of various scenarios based on a watermark but also services based on a fingerprint, and for content distributed previously without any watermark inserted therein, more related services may be provided using a fingerprint, compared to a case of using only a watermark.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing content-related information based on a digital watermark and fingerprint, the method comprising:
   receiving a request for content-related information from a client terminal;
   using a watermark and a fingerprint of content to retrieve the requested content-related information from a database; and
   transmitting the retrieved content-related information to the client terminal,
   wherein the receiving of the request comprises receiving watermark information and fingerprint information of the content from the client terminal,
   wherein the watermark information received from the client terminal is information in which the watermark has been decoded,
   wherein the transmitting comprises integrating content-related information retrieved by using the watermark information with content-related information retrieved by using the fingerprint information, and
   wherein the integrating comprises classifying, into categories, the content-related information retrieved by using the watermark information and the content-related information retrieved by using the fingerprint information, to integrate the classified information by each category.

2. The method of claim 1, further comprising:
   generating a watermark for content to insert the generated watermark into the content;
   storing information on the generated watermark and content-related information associated with the information on the generated watermark in the database; and
   extracting a fingerprint from the content; and storing information on the extracted fingerprint and content-related information associated with the information on the extracted fingerprint in the database.

3. A system for providing content-related information based on a digital watermark and fingerprint, the system comprising:
   a database; and
   a server controller configured to retrieve content-related information from a database by using content watermark information received from a client terminal, and to retrieve content-related information from a database by using content fingerprint information received from the client terminal, so as to provide the client terminal with the retrieved content-related information associated with the watermark information and the retrieved content-related information associated with the fingerprint information,
   wherein the content watermark information received from the client terminal is information in which the watermark has been decoded,
   wherein the server controller integrates the content-related information associated with the retrieved watermark information with the content-related information associated with the retrieved fingerprint information, to provide the integrated information to the client terminal, and
   wherein the server controller classifies, into categories, the content-related information associated with the retrieved watermark information and the content-related information associated with the retrieved fingerprint information, to integrate the classified information by each category.

* * * * *